(12) United States Patent
Kasten et al.

(10) Patent No.: US 7,290,633 B2
(45) Date of Patent: Nov. 6, 2007

(54) STEERING RESPONSIVE WHEEL DRIVE SYSTEM

(75) Inventors: Robert Eugene Kasten, Denver, CO (US); Mervin Peter Kizlyk, Cedar Falls, IA (US); Norman Frederick Lemmon, Cedar Falls, IA (US); Bernard Brandt Poore, East Moline, IL (US)

(73) Assignee: Deere & Company, Moline, IL (US)

( * ) Notice: Subject to any disclaimer, the term of this patent is extended or adjusted under 35 U.S.C. 154(b) by 217 days.

(21) Appl. No.: 11/133,260

(22) Filed: May 19, 2005

(65) Prior Publication Data

US 2006/0260859 A1    Nov. 23, 2006

(51) Int. Cl.
*B60K 23/08* (2006.01)
(52) U.S. Cl. .................... 180/248; 180/242
(58) Field of Classification Search .............. 180/248, 180/242, 252
See application file for complete search history.

(56) References Cited

U.S. PATENT DOCUMENTS

| | | | | |
|---|---|---|---|---|
| 4,669,559 A | * | 6/1987 | Fukui | 180/6.24 |
| 4,723,623 A | | 2/1988 | Teraoka et al. | 180/233 |
| 4,792,009 A | | 12/1988 | Iritani | 180/233 |
| 4,967,868 A | | 11/1990 | Schwarz et al. | 180/233 |
| 5,293,956 A | | 3/1994 | Onishi | 180/233 |
| 5,343,971 A | | 9/1994 | Heidelberg et al. | 180/65.4 |
| 5,465,806 A | | 11/1995 | Higasa et al. | 180/165 |
| 5,560,447 A | * | 10/1996 | Ishii et al. | 180/242 |
| 5,564,518 A | * | 10/1996 | Ishii et al. | 180/242 |
| 5,819,870 A | * | 10/1998 | Braun | 180/305 |
| 5,823,284 A | * | 10/1998 | Hoar et al. | 180/240 |
| 5,850,886 A | * | 12/1998 | Kouno et al. | 180/6.24 |
| 6,382,339 B1 | * | 5/2002 | Nemoto | 180/248 |
| 6,480,778 B2 | * | 11/2002 | Tanaka et al. | 701/69 |
| 6,932,179 B2 | * | 8/2005 | Sakikawa et al. | 180/242 |
| 2002/0112910 A1 | | 8/2002 | Nemoto | 180/247 |
| 2003/0079928 A1 | | 5/2003 | Hasegawa | 180/248 |

FOREIGN PATENT DOCUMENTS

JP    57 205230 A    12/1982
JP    2002 263536    9/2002

* cited by examiner

*Primary Examiner*—Tony Winner

(57) ABSTRACT

A vehicle drive speed control system is provided for a vehicle having driven rear wheels, driven steerable front wheels, a powertrain for driving the front and rear wheels at controllable speeds. A control unit controls the powertrain so that a front/rear wheel speed ratio is a non-linear trigonometric function of a sensed steering angle signal. The front/rear wheel speed ratio increases as the steering angle increases. The relationship of the front/rear wheel speed ratio to the steering angle is represented by a curve which is concave in a direction of an axis of increasing speed ratio. With a mode select switch, an operator can selectively cause the control unit to control the front/rear speed ratio according to a first normal or a second more aggressive predefined relationship.

13 Claims, 2 Drawing Sheets

STEERING RESPONSIVE WHEEL DRIVE SYSTEM

BACKGROUND

This invention relates to a steering responsive wheel drive system for a four wheel drive vehicle.

On a four wheel drive vehicle with two steered wheels, the two steered wheels travel a longer distance when the vehicle turns than do the non-steered wheels. If such a vehicle has a drive system where the front and rear axles are connected together with gears and shafts so that drive ratio between front and rear axle is constant, the drag from steered wheels not running fast enough will resist vehicle steering and vehicle pulling ability. To counteract this problem, some vehicles are designed so that the drive is disconnected from the steered wheels when the vehicle is turning. But, this drastically decreases the pulling ability of the vehicle.

In conventional mechanical four wheel drive tractors with Ackerman-type steering mechanisms, in order to assure that the steered wheels assist in propelling the vehicle, it is known to overspeed the front wheels by a constant 5% or 6% above the speed required by the Ackerman steering geometry.

Other vehicles are known which counteract this problem by rotating the steered wheels faster than the non-steered wheels during sharp turns, by automatically stepping a gear when the steering angle reaches a predetermined point. For example, U.S. Pat. No. 4,792,009, issued 20 Dec. 1988, and assigned to Kubota, Ltd., discloses a four wheel drive vehicle with a front wheel change speed mechanism which is controlled to produce a high speed state with the front wheels accelerated when a steering angle of the front wheels exceeds a predetermined angle. U.S. Pat. No. 4,723,623, issued 9 Feb. 1988, and also assigned to Kubota, Ltd., discloses a four wheel drive vehicle with a front wheel drive transmission which, in response to a front wheel steering operation, switches to an accelerating mode in which the average speed of the front wheels is greater than the average speed of the rear wheels. But, these systems produce an abrupt step-wise wheel speed change and can cause considerable tire scuffing and soil displacement when operative.

U.S. Pat. Nos. 5,343,971 and 5,465,806 describe systems with motors on either side of the vehicle wherein the motors are controlled to provide differential steering as a function of a sensed steering angle. But, these systems do not provided front wheel speeds which are greater than the rear wheel speeds.

SUMMARY

Accordingly, an object of this invention is to provide a vehicle drive system wherein a front/rear wheel speed ratio is controlled substantially continuously as a function of front wheel steering angle.

Another object of this invention is to provide a vehicle drive system wherein a front/rear wheel speed ratio increases in a non-linear manner with respect to increasing front wheel steering angle.

Another object of this invention is to provide a vehicle drive system wherein an operator can select and enable different front/rear wheel speed ratio versus front wheel steering angle relationships.

These and other objects are achieved by the present invention, wherein a vehicle drive speed control system is provided for a vehicle having driven rear wheels, driven steerable front wheels, and a powertrain for driving the front and rear wheels at controllable speeds. A control unit controls the powertrain so that a front/rear wheel speed ratio is a non-linear trigonometric function of a sensed steering angle signal. The front/rear wheel speed ratio increases as the steering angle increases. The relationship of the front/rear wheel speed ratio to the steering angle is represented by a curve which is concave in a direction of an axis of increasing speed ratio. With a mode select switch, an operator can selectively cause the control unit to control the front/rear speed ratio according to a first normal or a second more aggressive predefined relationship.

DETAILED DESCRIPTION

Figure 1:
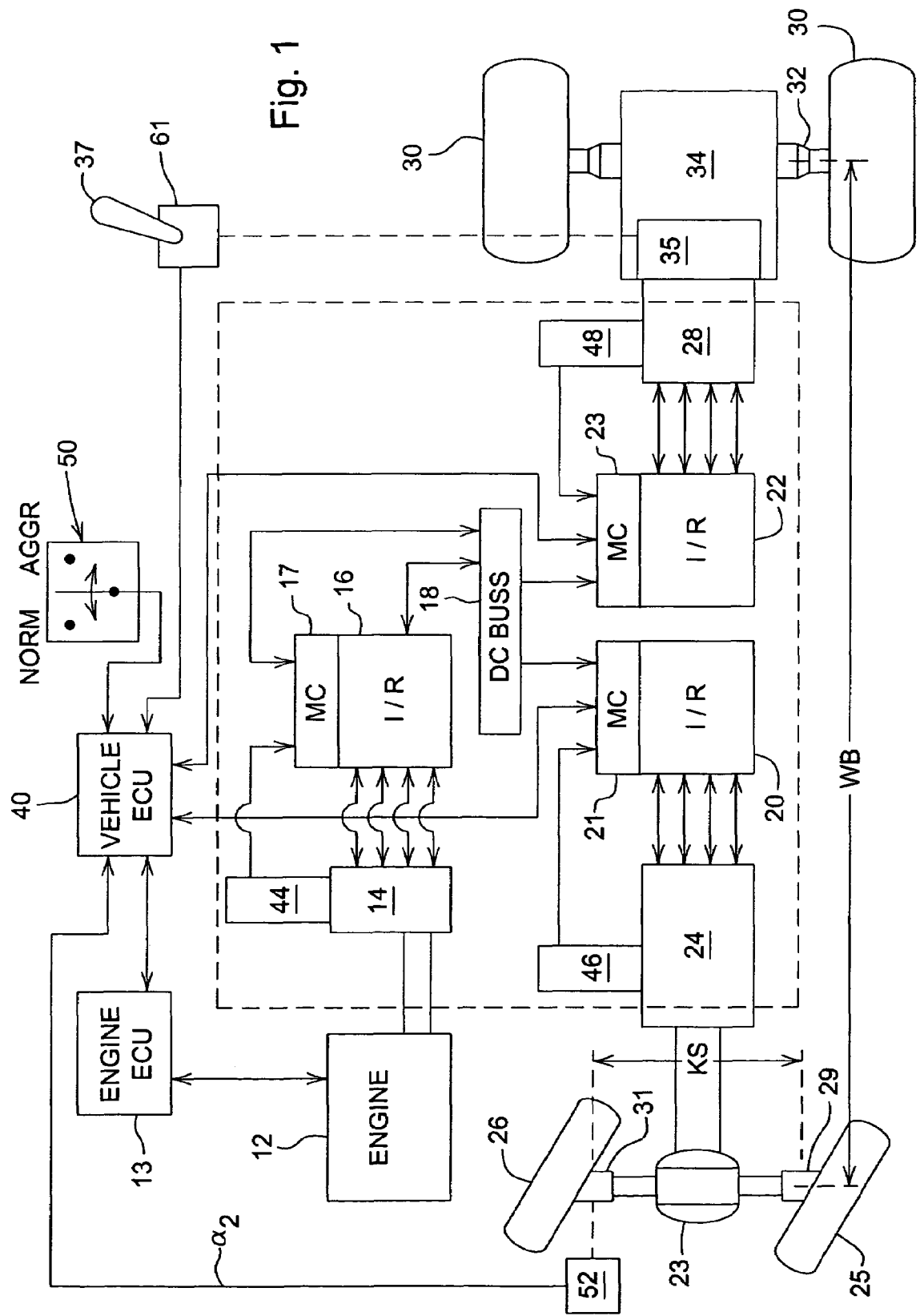
FIG. 1 is a simplified schematic diagram of a four wheel drive vehicle for which the present invention is applicable.

Referring to FIG. 1, a vehicle electric drive system 10 includes an internal combustion engine 12 controlled by electronic engine control unit (ECU) 13. The engine 12 drives a 3-phase electric motor/generator 14 which supplies electrical power to and receives power from a bi-directional inverter/rectifier 16, which is coupled to a high voltage DC buss 18. The buss 18 feeds power to and receives power from bi-directional inverter/rectifiers 20 and 22. Inverter/rectifier 20 is coupled to traction motor/generator 24 which drives and receives power from a front differential 27 which is connected to left front wheel 25 and right front wheel 26. Front wheels 25 and 26 are steerable about corresponding conventional left and right kingpins 29 and 31 which are spaced apart by a kingpin separation distance KS.

Preferably, the vehicle has a conventional front axle steering mechanism (not shown) which approximates Ackerman steering. Ackerman steering is a geometry in which, during a turn, lines drawn through the axle of all wheels on the vehicle intersect at a common point, the center of turn of the vehicle.

Inverter/rectifier 22 is coupled to traction motor/generator 28 which drives and receives power from rear wheels 30 via axle 32 via speed reducer 34. The front wheels 25, 26 are spaced apart from the rear wheels 30 by a wheelbase distance WB. Speed reducer 34 includes a high/low range box 35 which is controlled by a high/low range selector lever 37. Each inverter/rectifier 16, 20 and 22 is controlled by a corresponding micro-controller 17, 21 and 23, respectively. The motors 24 and 28 form part of a drive train which can controllably drive the front wheels 25, 26 and the rear wheels 30.

The motors 24 and 28 are preferably DC brush-less permanent magnet motors. Preferably, the rear motor 28 drives the rear axle through a two speed mechanically shifted gear box. Two speed gearing results in efficient motor operation because high gear provides the required speed to the axle for transport speeds, while the low gear provides the required torque to the axle for heavy pulling at low speeds.

An electronic vehicle control unit VCU 40 is operatively connected to the engine ECU 13, the micro-controllers 21 and 23. Rotor position sensors 44, 46 and 48 are coupled to each of the motor/generators 14, 24 and 28 and supply a rotation position signal to the corresponding micro-controllers 17, 21 and 23, which derive a speed signal therefrom.

The inverter/rectifiers 20, 22 invert and convert the DC buss current to a 3-phase AC current at a frequency to drive the wheels at a speed commanded by the operator via a speed control (not shown). The rotor position sensors 46, 48, and the micro-controllers 21, 23 form a closed speed control loop for each of the electric drive motors 24 and 28, in which the micro-controllers 21, 23 calculate a speed error from the difference between the commanded speed from the speed control (not shown) and the actual speed derived from sensors 46, 48, and a current is applied to the motors as a function of the speed error.

According to the present invention, an operator controlled mode select switch 50 is connected to the VCU 40. The electronic vehicle control unit VCU 40 receives a steering angle signal $\alpha_2$ from steering angle sensor 52 which is operatively connected to the right kingpin 31. The mode select switch 50 has an operator selectable first or "normal" state (NORM) and a second or "aggressive" state (AGGR), corresponding to a pair of different front/rear speed ratio versus steering angle control functions or relationships, as described below.

Figure 2:
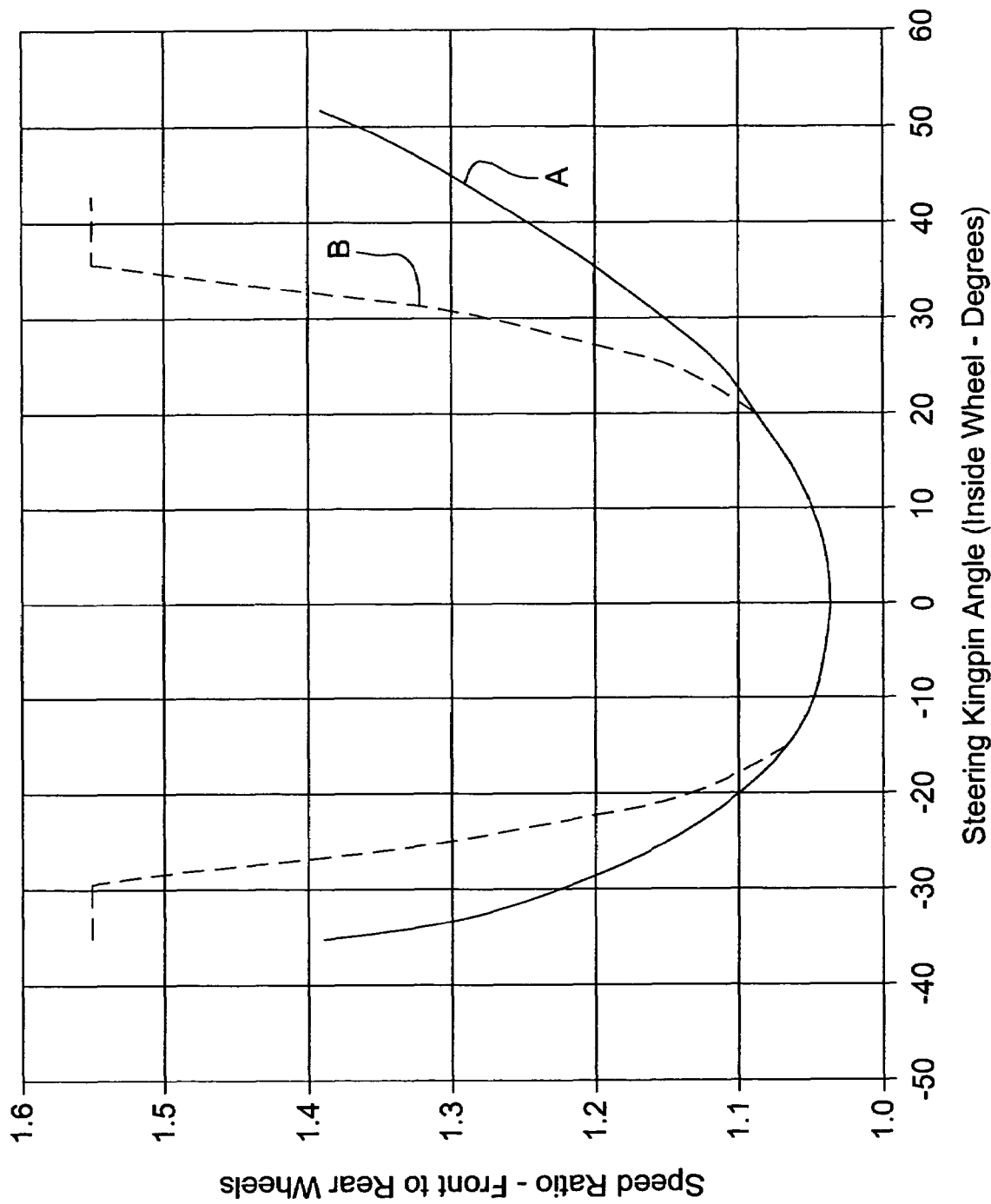
FIG. 2 is a graphical representation of a pair of front/rear wheel speed ratio versus steering angle functions implemented according to the present invention.

When switch 50 is in its NORM state, the VCU 40 controls the front motor 24 and the rear motor 28 according to a relationship illustrated by curve A of FIG. 2, wherein the front/rear motor speed ratio is a non-linear function of the steering angle $\alpha_2$, and wherein the ratio increases with increasing magnitude of the steering angle $\alpha_2$. The curve A is concave in a direction parallel to an axis of increasing speed ratio. When the front motor 24 and the rear motor 28 are controlled according to this relationship, the steered wheels operate at a speed such that the steered wheels generate a tractive force in nearly the same proportion to the tractive force generated by the rear wheels as they do when the tractor is driving in a straight line. The wheel slippage is minimal as is disturbance of the soil/sod over which the vehicle is being driven.

This relationship can be implemented by the following non-linear trigonometric equation:

$$R(ms) = C + \{WB + [WB \times \cos(\alpha_2) - KS \times \sin(\alpha_2)]^2 + WB^2 \times \sin^2(\alpha_2)\}^{1/2} \div \{2 \times WB \times \cos(\alpha_2) - KS \times \sin(\alpha_2)\}, \quad [1]$$

where R(ms) is the ratio of the front motor speed to the rear motor speed, KS is the kingpin separation, WB is the wheelbase WB, and where C is a constant. Preferably, C is a small value, such as 0.03 to 0.06 so that, even during straight ahead travel when the steering angle $\alpha_2$ is zero, the front motor speed will be faster than the rear motor speed so the steered front wheels 25, 26 will always be helping to pull the vehicle.

Equation [1] assumes that the front and rear wheels have the same diameter. If the front and rear wheels have different diameters, then the following equation should be used:

$$R(ms) = R(wd) \times (C + \{WB + [WB \times \cos(\alpha_2) - KS \times \sin(\alpha_2)]^2 + WB^2 \times \sin^2(\alpha_2)\}^{1/2} \div \{2 \times WB \times \cos(\alpha_2) - KS \times \sin(\alpha_2)\}), \text{ where } R(wd) \text{ is the ratio of the rear wheel diameter to the front wheel diameter.} \quad [2]$$

When switch 50 is in its aggressive state, the VCU 40 preferably controls front/rear motor speed ratio as a function of steering angle $\alpha_2$ according to the more aggressive relationship represented by curve B of FIG. 2. Curve B is similar to curve A, in that the front/rear motor speed ratio is also a non-linear function of the steering angle $\alpha_2$, and that the ratio also increases with increasing magnitude of the steering angle $\alpha_2$. However, as is clear from FIG. 2, the front/rear motor speed ratio of curve B increases faster than that of curve A as a function of the steering angle $\alpha_2$ for at least a range of steering angles greater than a certain magnitude. For steering angles less than a certain magnitude curve B may closely match curve A. The second relationship over-speeds the steered wheels a significant amount so that the driven steered wheels will pull the vehicle into a smaller turning radius than would otherwise result from the steering geometry, and results in increased wheel slip and increased disturbance of the soil/sod over which the vehicle is being driven.

Thus, when switch 50 is in its first or normal state NORM, the VCU 40 controls the front/rear speed ratio according to the first predefined relationship represented by curve A and equation [1]. When switch 50 is in its second or aggressive state AGGR, the VCU 40 controls the front/rear speed ratio according to a second predefined relationship represented by curve B.

As practical matter, in order to conserve limited computing resources of the vehicle control unit 40, these non-linear equations or relationships are preferably implemented in the vehicle control unit 40 by stepwise linear approximations, using known programming techniques.

Driving the front steered wheels at a higher speed during turning increases the vehicle's corner pulling capacity and helps to pull the front end through the turn. In a vehicle with electric driven wheels, this capability can be implemented by merely adding a steering angle sensor and modifying the control algorithm which controls the front and rear speeds. The result is improved performance that changes speed so imperceptibly an operator will hardly know there is anything special about the drive. The aggressiveness of the steered wheel drive can be modified by changing software rather than tooling up a new gear set. When operating on sod, i.e., mowing grass at a golf course or field operation in muddy conditions, or any other condition where the operator wishes to minimize the disturbance to the soil, the normal mode of operation would be chosen at the cost of a larger turning radius. The operator can use switch 50 to choose the most appropriate level of front wheel overspeed for the current operation and field conditions.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A vehicle drive speed control system for a vehicle having driven rear wheels, driven steerable front wheels, and a powertrain for driving the front and rear wheels at controllable speeds, the control system comprising:
   a steering angle sensor for generating a steering angle signal representing a steering angle of the front wheels;
   a control unit for controlling the powertain so that a front/rear wheel speed ratio is a non-linear approximately continuous function of the steering angle signal, and the front/rear wheel speed ratio increases as the steering angle increases; and
   an operator controlled mode select switch connected to the control unit, the mode select switch having operator selectable first and second states, and when the mode select switch is in its first state, the control unit controls the front/rear speed ratio according to a first predefined relationship, and when the mode select switch is in its second state, the control unit controls the front/rear speed ratio according to a second predefined relationship.

2. The control system of claim 1, wherein:
the front/rear wheel speed ratio is a non-linear approximately continuous trigonometric function of the steering angle signal.

3. The control system of claim 1, wherein:
a relationship of the front/rear wheel speed ratio to the steering angle is represented by a curve.

4. The control system of claim 1, wherein:
a relationship of the front/rear wheel speed ratio to the steering angle is represented by a curve which is concave in a direction of an axis of increasing speed ratio.

5. The control system of claim 1, wherein:
the second predefined relationship is more aggressive than the first predefined relationship.

6. The control system of claim 1, wherein:
in the second predefined relationship the front/rear speed ratio increases faster with respect to steering angle than in the first predefined relationship.

7. The control system of claim 1, wherein:
the front/rear wheel speed ratio is a non-linear trigonometric function of the steering angle signal.

8. The control system of claim 1, wherein:
a relationship of the front/rear wheel speed ratio to the steering angle is represented by a curve.

9. The control system of claim 1, wherein:
a relationship of the front/rear wheel speed ratio to the steering angle is represented by a curve which is concave in a direction of an axis of increasing speed ratio.

10. The control system of claim 1, wherein:
the front and rear wheels are separated by a wheelbase distance, WB;
the front wheels include left and right front wheels, each steerable about an axis of a corresponding left and right kingpin, the left and right kingpins being separated by a kingpin spacing, KS; and
the control unit controls the powertain so that the front/rear wheel speed ratio is a non-linear trigonometric function of the steering angle signal, the wheel base distance WB, and the kingpin spacing, KS.

11. The control system of claim 5, wherein:
the trigonometric function comprises:

$$C+\{WB+\{[WB \times \cos(\alpha_2) - KS \times \sin(\alpha_2)]^2 + WB^2 \times \sin^2(\alpha_2)\}^{1/2}\} \div \{2 \times WB \times \cos(\alpha_2) - KS \times \sin(\alpha_2)\},$$

where C is a constant and where $\alpha_2$ is the steering angle.

12. The control system of claim 1, wherein:
a relationship of the front/rear wheel speed ratio to the steering angle is represented by a stepped function which approximates a concave curve.

13. A vehicle drive speed control system for a vehicle having driven rear wheels, driven steerable front wheels, and a powertrain for driving the front and rear wheels at controllable speeds, the control system comprising:
a steering angle sensor for generating a steering angle signal representing a steering angle of the front wheels; and
a control unit for controlling the powertain so that a front/rear wheel speed ratio is a non-linear approximately continuous function of the steering angle signal, and the front/rear wheel speed ratio increases as the steering angle increases, the front/rear wheel speed ratio being a non-linear approximately continuous trigonometric function of the steering angle signal.

* * * * *